United States Patent [19]

Butterly, Jr. et al.

[11] Patent Number: 4,634,333
[45] Date of Patent: Jan. 6, 1987

[54] CONVEYOR LINE LOADER FOR MULTI-TIERED ROLLING CARTS

[75] Inventors: Edward R. Butterly, Jr., Brookfield; Doyle E. Stoppel, Danbury, both of Conn.

[73] Assignee: Doran Brothers Inc., Danbury, Conn.

[21] Appl. No.: 662,724

[22] Filed: Oct. 19, 1984

[51] Int. Cl.4 .......................................... B65G 67/00
[52] U.S. Cl. ..................... 414/331; 187/20; 198/435; 414/400; 414/401; 414/609; 414/786
[58] Field of Search ............... 414/331, 786, 277, 280, 414/285, 373, 389, 391, 392, 395, 396, 400, 401, 572, 584, 585, 592, 609, 87, 89; 187/20, 94; 198/429, 430, 435; 53/152, 535, 539

[56] References Cited

U.S. PATENT DOCUMENTS

| | | | |
|---|---|---|---|
| 2,556,082 | 6/1951 | Hartness | 198/429 X |
| 2,644,627 | 7/1953 | Newbold | 53/535 X |
| 2,661,100 | 12/1953 | Ashford | 414/331 |
| 2,718,972 | 9/1955 | Temple | 414/331 X |
| 3,051,292 | 8/1962 | Sundquist et al. | 198/429 |
| 3,594,977 | 7/1971 | Grasvoll | 53/535 |
| 3,637,095 | 1/1972 | Kampfer | 414/331 |
| 3,737,009 | 6/1973 | Stoddard | 187/94 X |
| 3,952,888 | 4/1976 | Carrie | 414/400 |
| 4,016,986 | 4/1977 | Thomas | 414/280 X |
| 4,032,027 | 6/1977 | Lindberg | 414/280 X |
| 4,039,072 | 8/1977 | Keller et al. | 414/609 X |
| 4,203,696 | 5/1980 | Lindberg | 414/277 X |
| 4,277,216 | 7/1981 | Lindberg | 414/331 |
| 4,379,671 | 4/1983 | Cochran | 414/331 |

Primary Examiner—Joseph E. Valenza
Assistant Examiner—David A. Bucci
Attorney, Agent, or Firm—Mattern, Ware, Stoltz & Fressola

[57] ABSTRACT

A cart loader assembles objects advancing along an infeed conveyor line into arrayed rows of parallel columns, and transfers these arrayed rows of columns to individual shelves of a multi-tiered rolling cart. The cart loader has an external frame enclosing a vertically elongated front elevator and a central staging zone fed by the infeed conveyor. A multi-deck elevator has decks spaced apart vertically by a distance corresponding to the vertical distance between shelves on the multi-tiered cart, latched to the frame for loading. A plurality of horizontally deployable and retractable pushers are each aligned respectively with one shelf, and positioned for delivery of objects from the elevator zone to the cart. A preferred deck-loading and cart-shelf loading sequence achieves minimum loading cycle time coupled with maximum time within each cycle for replacing each loaded cart with an empty cart for the next loading operation.

17 Claims, 22 Drawing Figures

FIG. 14H

CONVEYOR LINE LOADER FOR MULTI-TIERED ROLLING CARTS

TECHNICAL FIELD

This invention relates to cart loaders for use in food packaging and other production lines for loading conveyor-delivered articles onto the shelves of multi-tiered rolling carts. In particular, the cart loaders of this invention are useful in dairies and food production plants, where food containers such as half-gallon or one-gallon milk bottles or cartons are filled, sealed, and delivered along a production line. Rolling carts have often proved more effective than conventional cases for transporting the product from the packaging plant to the point of sale, and automated cart loaders are urgently needed to minimize the human labor required to load containers onto the shelves of rolling carts.

BACKGROUND ART

A number of patents have proposed various devices for loading multi-tiered carts, but the task of arranging a plurality of articles advancing in a column along a production line by assembling them into compact rows and columns arrayed on the multiple shelves of a rolling cart requires successive staging of two or four or six columns of articles aligned in rows, in order to provide compact loading of each shelf of the multi-tiered cart, and raising or lowering of the cart or the articles is also required in order to align them for loading onto each shelf in turn.

Kampfer U.S. Pat. No. 3,637,095, issued in 1972, shows in FIG. 1 a machine with vertically movable shelves, all collected at the bottom of their stroke at 75 in FIG. 1 of the patent. These shelves are successively loaded at the level of the input conveyor 14 in the patent and then successively raised to positions 71, 72, 73 and 74.

Schroeder U.S. Pat. No. 1,518,278 loads successive pallet trays of bricks, stacked one above the other, on an elevator for transfer to a specialized truck with a series of pallet engaging flanges 110, which unloads the entire elevator in a single step and delivers all of the pallets to a kiln for curing. Carothers U.S. Pat. No. 2,935,908 shows a similar arrayed plurality of forks successively picking up green ceramic tiles from their delivery conveyor and arraying them vertically for glazing and curing.

Several Lindberg hospital tray loading patents show a rolling cart, where successive food trays delivered by a conveyor are arrayed in a vertically reciprocated elevator rack 7. In Lindberg's earliest U.S. Pat. No. 4,032,027, issued in 1977, the arrayed trays are transferred by a pusher 8 or 9 from the elevator to the rolling cart tiers. The later Lindberg U.S. Pat. Nos. 4,203,696 and 4,277,216 show horizontally movable belt drive arms which reach into the cart and remove trays for redelivery to a conveyor leading to the dishwasher, and in the 1981 '216 patent such arms can be used either for loading or unloading the cart.

Grasvoll U.S. Pat. No. 3,594,977, issued in 1971, shows a rolling cart loader for milk cartons which raises the cart 27 successively from one level to another, while rows of milk cartons are assembled on a conveyor plate 8 and then delivered by a pusher 9 and stripper plate 18 to successive shelves of the rolling cart as the cart 27 is moved vertically from level to level by elevator 24. At column 4, lines 61-66, the reversal of this mechanism is suggested, with the cart being fixed and the conveyor plate 8, pusher 9 and stripper plate 18 being moved vertically, but such a reversed mechanism is not illustrated or otherwise disclosed in this Grasvoll patent.

Other patents show many different kinds of vertical conveyor stages, including one for loading tires on a rolling cart, Leblond Uniroyal U.S. Pat. No. 3,696,949, and Temple U.S. Pat. No. 3,584,750 shows racks of bread loaves assembled on an elevator 38 from a delivery conveyor 263 and then all moved together by a pusher 304 onto a multi-tiered rolling cart. Ashford U.S. Pat. No. 2,661,100 shows a bottle-rolling case loader for a rolling cart hoisted on an elevator.

The operations of assembling or "staging" the advancing procession of containers into groups for shelf loading requires momentary interruptions in the procession each time an assembled column is moved sidewise to make room for the succeeding column, and each time the staged rows of columns are moved onto the cart shelves. If these periods of interruption of the advancing procession of containers are minimized, the loading operation is thereby made more efficient.

A further interruption in the normal loading operation often occurs when the cart has been completely filled and must be disengaged from the loading station and rolled away, to permit an empty cart to be rolled into position for loading.

In the Kampfer U.S. Pat. No. 3,637,095 discussed above, five individually elevated shelves are successively filled with containers and raised into positions aligned horizontally with the shelves of an adjacent rolling cart. These elevated shelves are then moved en masse to project into the cart, between the cart shelves, by advancing an entire internal subframe of the overall device, and retainer bars are then held stationary behind the containers as the elevated shelves are withdrawn together, leaving the entire cart fully loaded with containers. If desired, as shown in this patent, the adjacent one-half of each cart shelf may be loaded simultaneously from one side of the cart, and the cart may then be reversed for loading the empty remaining halves of each cart shelf simultaneously by a similar operation. While this Kampfer cart loader thus occupies most of its cycle time in successively loading and raising individual elevated shelves, the complex mechanism required to perform this function and then to move the entire subframe back and forth for each cart loading step requires close tolerances in fabrication and alignment, with many moving parts that may mis-align or jam in operation, and considerable loads must be moved both vertically and horizontally by the drive mechanism.

Kampfer's cart loader is understood to have been manufactured by Ex-Cell-O Materials Handling Co., an affiliate or successor to Conveyor Specialties Co., the assignee of the Kampfer's patent. The same company manufactures a travelling tray cart loader in which trays move in a rectangular path: they are loaded, moved upward, advanced forward across the top of the machine, lowered downward into alignment with the cart shelves, unloaded onto the cart shelves and lowered further for return to the tray loading station, sweeping out a rearward, upward, forward, and downward rectangular path during a full cycle of machine operation. This travelling tray cart loader thus requires a great number of trays and substantial power requirements as well as complex mechanism and the need for a depressed pit below normal floor level or an elevated ramp to raise the empty carts, to permit the return of unloaded trays to the tray loading station.

The cart loaders of the present invention provide many advantages over these conventional prior art cart loader proposals.

BRIEF SUMMARY OF THE INVENTION

The cart loaders of this invention employ a simple multi-deck counterbalanced elevator, indexed into successive positions with each deck in turn aligned with an in-feed conveyor and a staging platform from which advancing containers are loaded directly onto the elevator decks. Preferably, the loaded elevator is unloaded directly onto the shelves of an adjacently latched rolling cart from its two limit positions, its lowermost position and its uppermost position, following which the loaded cart is unlatched and withdrawn, to be replaced by an empty cart for the next cart loading cycle. The central elevator deck is preferably fixed relative to the elevator frame, while the other elevator decks are adjustable for alignment with different rolling cart shelf levels. Fine adjustments of the elevator loading height are made by a turnbuckle type connection joining a counterweighted balance arm to the elevator by a chain and sprocket connection. The exact length of the elevator stroke may be adjusted by a radial screw adjustment on the pivoted balance arm. Supporting the arm from the main frame is a series array of pneumatic cylinders whose piston rods may be extended or contracted independently to provide different successive elevator positions. In order to raise a vertical sliding gate mounted on the side of each rolling cart from its gate position maintaining containers on the cart shelves to its loading position in which access to the shelves is cleared for sliding sidewise container loading, a gate lift mechanism is mounted on the upper front portion of the frame above cart latch blocks securing the cart in position during the loading operation and releasing it when loading is completed.

Pneumatically actuated pushers are provided to propel staged arrays of containers from the in-feed conveyor onto the elevator decks, and from the elevator decks onto the rolling cart shelves. As the cycle progresses, fail safe sensors are preferably provided to monitor each successive step in the loading operation as rows of columns are assembled in the staging zone. Electrical or pneumatic limit switches are employed to assure the completion of each step in turn before the next step is automatically actuated. An electric motor is preferably employed to power the in-feed conveyor, and pneumatic cylinders preferably raise and lower the elevator and advance the pushers as required. The switching and cycle control of each successive operating step in the cycle may be electrical, but in production plants where conveyor lines are exposed to liquids, pneumatic control systems are often preferred.

The cart loaders of this invention are compact and economical in construction and highly efficient in operation with a minimum number of moving parts vulnerable to misalignment or jamming. At the same time, by performing the transfer operation by loading assembled and staged containers onto the adjacent cart shelves in two successive operations, a period of time amounting to more than one-half of the overall operating cycle is available for the disengagement and removal of each loaded cart and the positioning and engagement of the next unloaded cart, ready for the next loading operation, minimizing interruptions in conveyor line operation and achieving maximum efficiency in cart loading.

Accordingly, a principal object of the invention is to provide sturdy, durable, compact and economical automatic cart loaders capable of assembling containers advancing along an infeed conveyor into arrayed columns and loading them successively onto the shelves of a multi-tiered rolling cart, making highly efficient use of the cargo carrying capacity of a counterbalanced elevator, and providing maximum periods out of each operating cycle during which carts may be changed.

Another object of the invention is to provide such cart loaders occupying minimum floor space and requiring minimum installation efforts when being set up, leveled and placed in operation.

A further object is to provide such cart loaders which are easily adjusted to cooperate with multi-tiered rolling carts having differing inter-shelf spacing or varying shelf heights above the floor.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

DETAILED DESCRIPTION OF THE BEST MODE FOR CARRYING OUT THE INVENTION

The rolling cart loaders 20 of the present invention are unusually compact, fast, and reliable devices, customarily fabricated of stainless steel and enclosed inside protective screening to avoid accidental injury to personnel. The protective screening has been removed in the drawings for clarity of disclosure.

Figure 1:
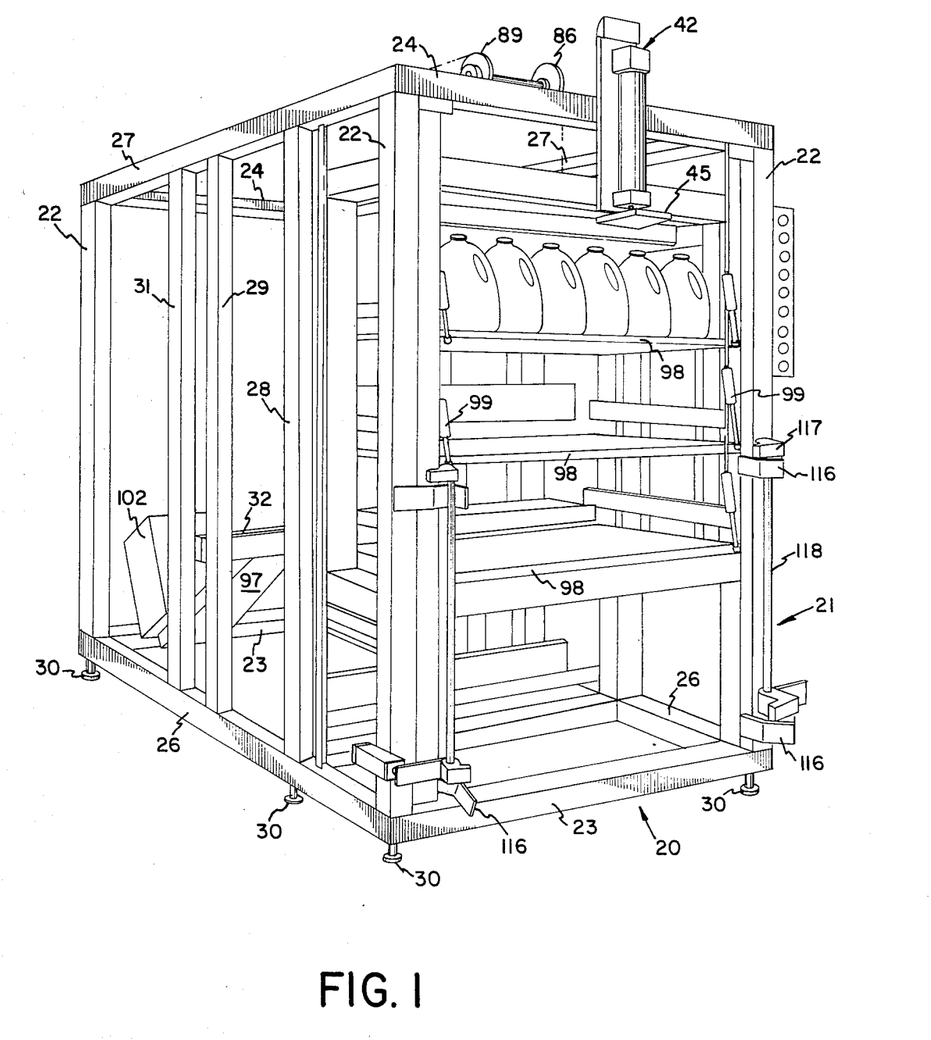
FIG. 1 a front corner is a perspective view of a cart loader embodying the features and advantages of the present invention, with the rolling cart removed to show the elevator in its upper position with its top deck loaded with plastic one-gallon milk containers.
Figure 7:
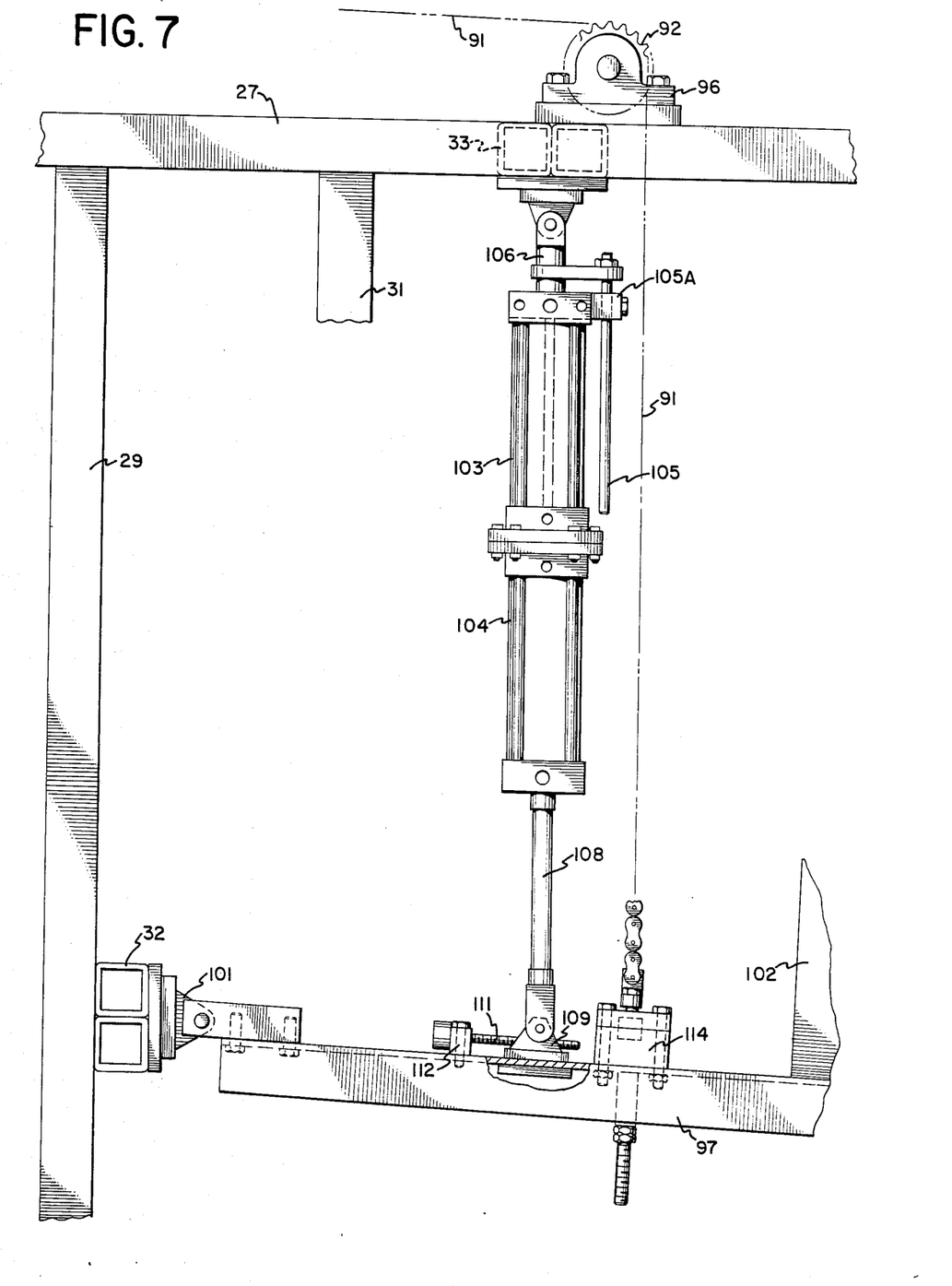
FIG. 7 is a fragmentary enlarged right side elevation view of the rear portion of the cart loader showing the counterweighted balance arm, its pivotal support, its series connected dual pneumatic cylinder drive device, and its elevator chain, with adjustable connections to the balance arm.

The output end of the loader 20 shown in FIG. 1 is normally considered the front, and for convenience the left side and right side, as shown in FIG. 1, are at the left and right sides of the viewer, standing in front of the machine. As shown on the right side view of FIG. 2, the main frame 21 is preferably formed of rectangular tubular box beams welded together to form a sturdy box with front and rear corner posts 22, front and rear bottom rails 23, front and rear top rails 24, right and left lower side rails 26, and right and left upper side rails 27, with intermediate side posts 28, 29 and 31 positioned vertically and spaced at intervals from the front corner toward the rear corner of each side of the frame. Heavy duty box beams formed of double square cross-section beams welded spanning the transverse width of the machine are employed at two locations to carry concentrated loads. These are the central transverse beam 32 (FIG. 7) extending horizontally across the frame, with its ends welded to the central side posts 29 and the central top transverse box beam 33 formed of two square cross-sectioned box beams spanning the space between the two upper side rails 27 toward the rear of the main frame 21. Both of these transverse dual box beams are shown in FIG. 7 where their connections to the heavy pivoted counterweight balance arm are clearly illustrated.

Figure 2:
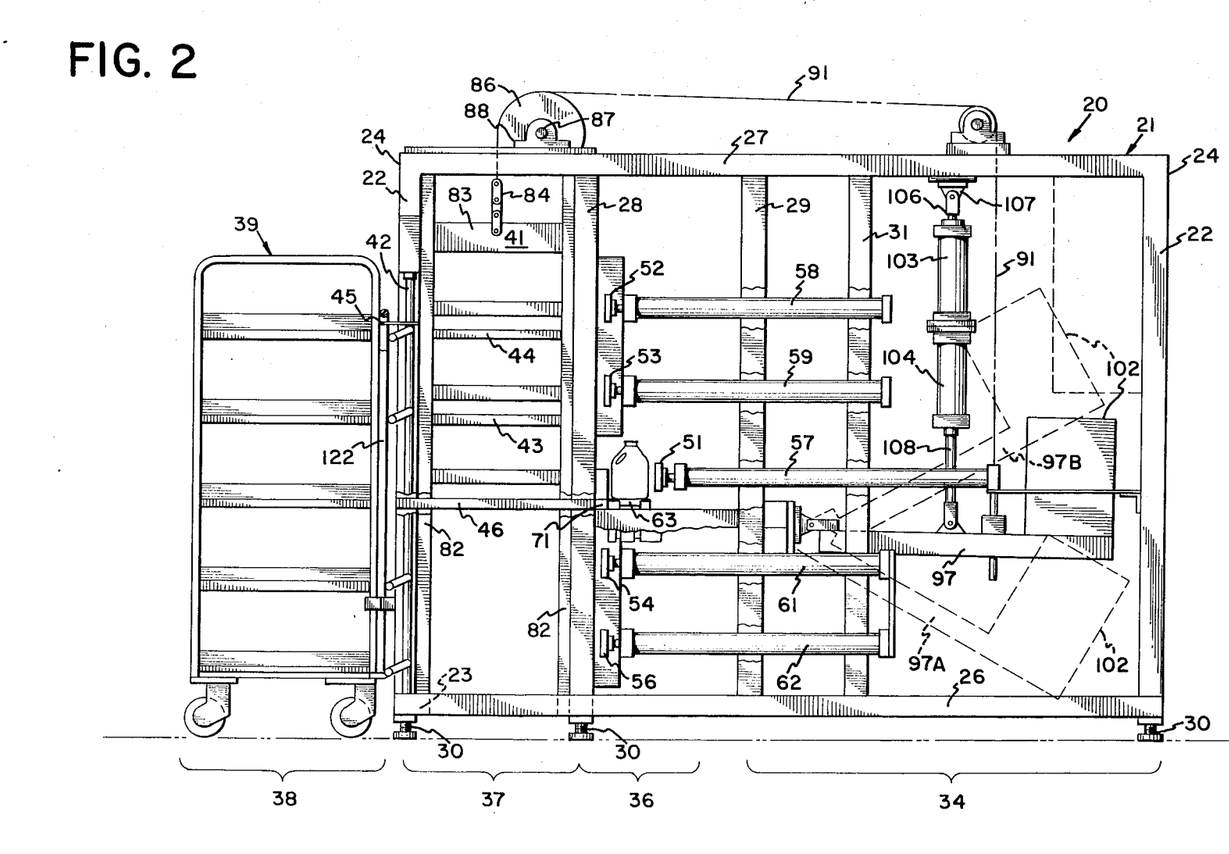
FIG. 2 is a right side elevation view of the same cart loader showing the rolling cart in adjacent latched engagement with the device, and with all five shelves of the rolling cart ready to be loaded with milk containers.

As indicated in FIG. 2, the cart loaders 20 of the present invention may be divided into four vertical zones: a rear counterweight zone 34, a central staging zone 36, an elevator zone 37, and a cart loading zone 38 directly in front of loader 20. As indicated in FIG. 2, the counterweight zone extends from the central vertical side posts 29 to the rear corner posts 22. The staging zone extends from the forward side posts 28 to the central side posts 29. The elevator zone extends from the corner 22 to the forward side posts 28, and the cart loading zone comprises the volume of space directly in front of the cart loader 20, where carts are engaged, loaded, disengaged, and removed.

While other rolled sections of such material as stainless steel, for example angles or channels, may be used to form these various component parts of the main frame 21, the use of tubular box beams preferably square in cross-section is preferred for light weight, sturdy stiffness and ease of cleaning. Adjustable supporting feet 30 are mounted at the lower ends of the corner posts 22 and of the forward side post 28 to permit leveling of the frame 21, avoiding distortion and equalizing floor loads while supporting the loaded elevator zone in a firm, stable orientation on the plant floor.

No pits or excavations of any kind are required to accommodate the cart loaders of this invention. Rolling cart 39, shown in the cart loading zone 38, is simply rolled up to the front face of the cart loader 20, as indicated in FIG. 2, and latched in position as described below. In the illustrated embodiment of the invention the multi-tiered cart 39 is provided with five shelves, and the elevator 41 reciprocating in the elevator zone 37 is provided with three decks spaced apart to match the intershelf spacing of cart 39. In the preferred embodiments of the invention the cart is provided with an odd number of shelves $2N+1$ while the elevator is provided with an odd number of $N+1$ decks, facilitating the loading operation in a highly efficient sequence, as hereinafter described.

Many rolling carts 39 are provided with a sliding side gate 122 which may be raised and lowered, like the side gate of a hospital bed, from a lower gate position in which its horizontal side rails are positioned several inches above the cart shelves to retain containers loaded thereon, to an upper position where the gate side rails are positioned just below the level of the next overlying cart shelf, thereby exposing the space beside the cart shelves for unobstructed container loading. For actuation of this cart gate, a gate lift 42 actuated by a pneumatic cylinder is mounted vertically in the center of the front top rail 24, as shown in FIG. 1.

Figure 8:
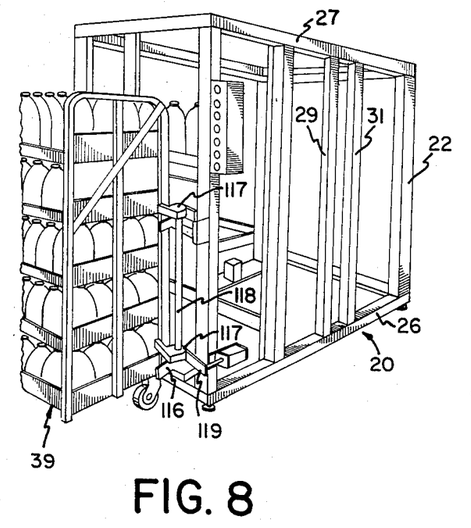
FIG. 8 is a right front corner view of the cart loader with the rolling cart engaged in loading position.
Figure 9:
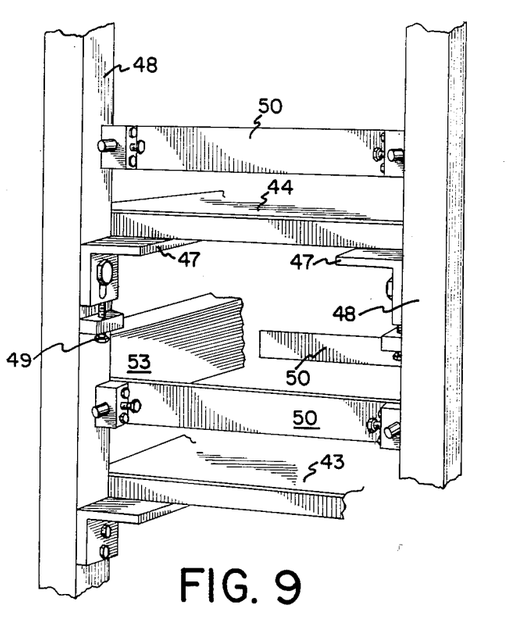
FIG. 9 is a greatly enlarged left side perspective view of the upper portion of the elevator showing the upper deck level adjustment and the lateral guide bars.
Figure 13:
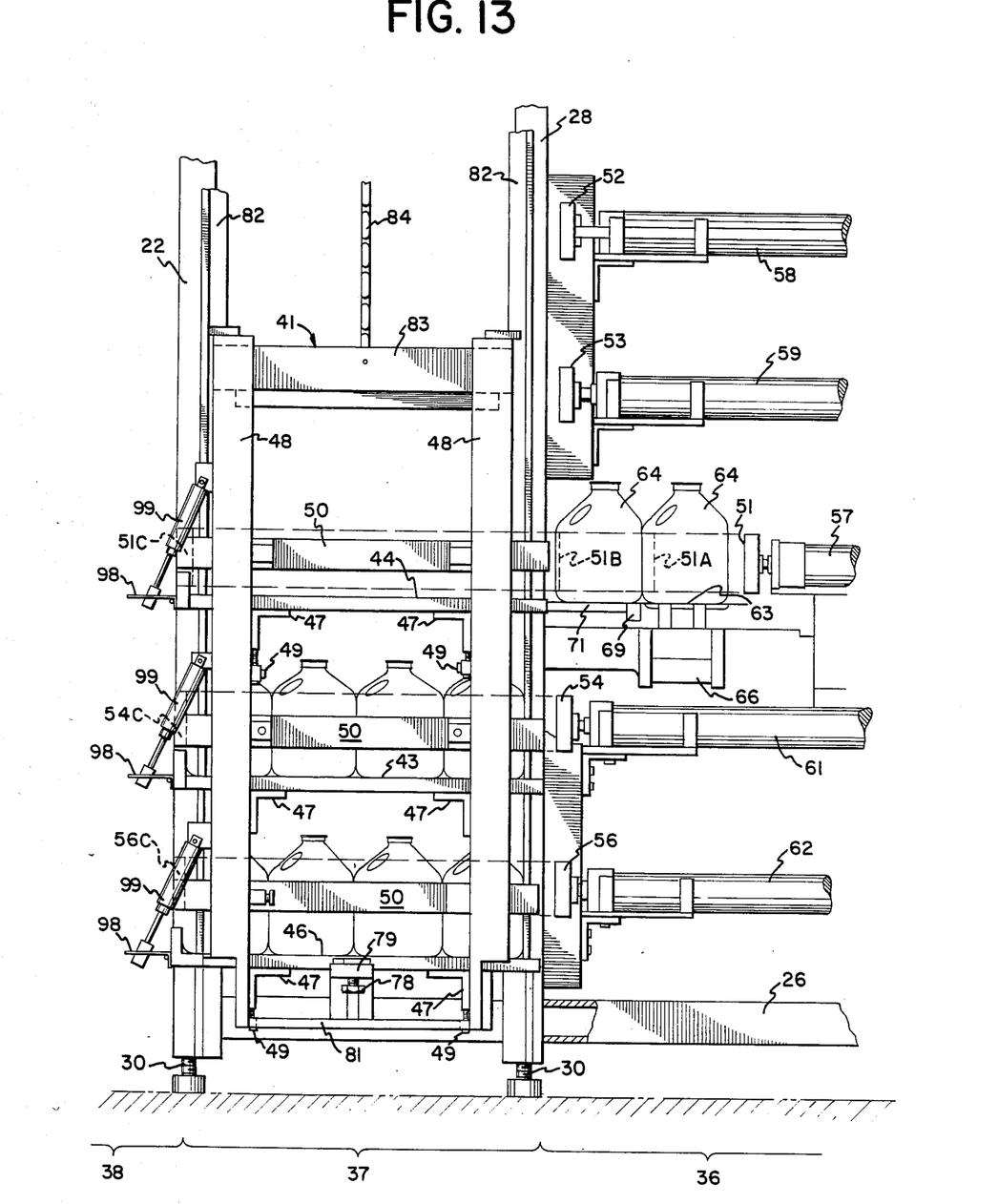
FIG. 13 is a fragmentary left side view of the central portion of the cart loader showing the in-feed conveyor, the assembly platform, and the three elevator decks with the uppermost deck being in position ready for loading.

Elevator 41 is shown in the right central portion of FIG. 1 and in the center of FIG. 2, and the elevator may also be seen in FIGS. 8 and 9 as well as FIG. 13. Essentially elevator 41 is a box frame supporting three elevator decks, a central deck 43 and upper and lower decks 44 and 46, whose spacing from the central deck 43 is adjustable within predetermined limits. As indicated in FIG. 9, slotted angle brackets 47 bolted to the corner posts 48 of the elevator 41 underlie upper deck 44 as well as lower deck 46 (FIG. 13) and a jack screw 49 positioned in a threaded aperture in a block bolted to each corner post 48 below each angle bracket 47 is adjusted to achieve the desired interdeck spacing, after which the bolts anchoring brackets 47 to corner posts 48 are tightened to secure the adjustable decks 44 and 46 in their predetermined, adjusted positions. A guide bar 50 extends across each end of each deck of elevator 41 to keep objects from sliding off the deck.

As shown in FIG. 2 and FIG. 13, a series of horizontally slidable laterally elongated pushers is arrayed one above the other facing each indexed deck position of the elevator along the front portion of the staging zone facing the elevator zone. These pushers comprise a central pusher 51, two upper pushers 52 and 53, and two lower pushers 54 and 56. Each of these pushers is a block-shaped plate extending across the width of the elevator deck and having a height corresponding to roughly one-half the height of the containers to be delivered to the elevator deck. Each pusher is provided with a horizontal pneumatic actuating cylinder extending rearward, with the central pusher 51 having an extra long cylinder 57 providing three stop positions. As shown in FIGS. 2 and 13, the two upper pushers 52 and 53 are actuated by upper cylinders 58 and 59, and the two lower pushers 54 and 56 are actuated by lower cylinders 61 and 62. Preferably the two upper cylinders 58 and 59 are actuated simultaneously, to provide synchronized forward pushing of containers standing on their elevator decks directly onto the adjacent cart shelves. The same is true of lower cylinders 61 and 62, which are normally actuated simultaneously to cause lower pushers 54 and 56 to advance to dash line positions 54C and 56C shown in FIG. 13, thereby delivering the containers arrayed before them on the two lower elevator decks 43 and 46 directly to the two lower cart shelves of cart 39.

The three stop positions of central pusher 51 actuated by the extra long central pusher cylinder 57 will be discussed in more detail below, since these three stop positions of this central pusher 51 are employed in successive staging steps assembling rows of columns of containers in the staging zone, and then delivering these assembled rows of columns to each elevator deck in turn as the elevator is indexed through its various successive positions, as shown in FIGS. 14A through 14H.

The Staging Zone

Figure 2A:
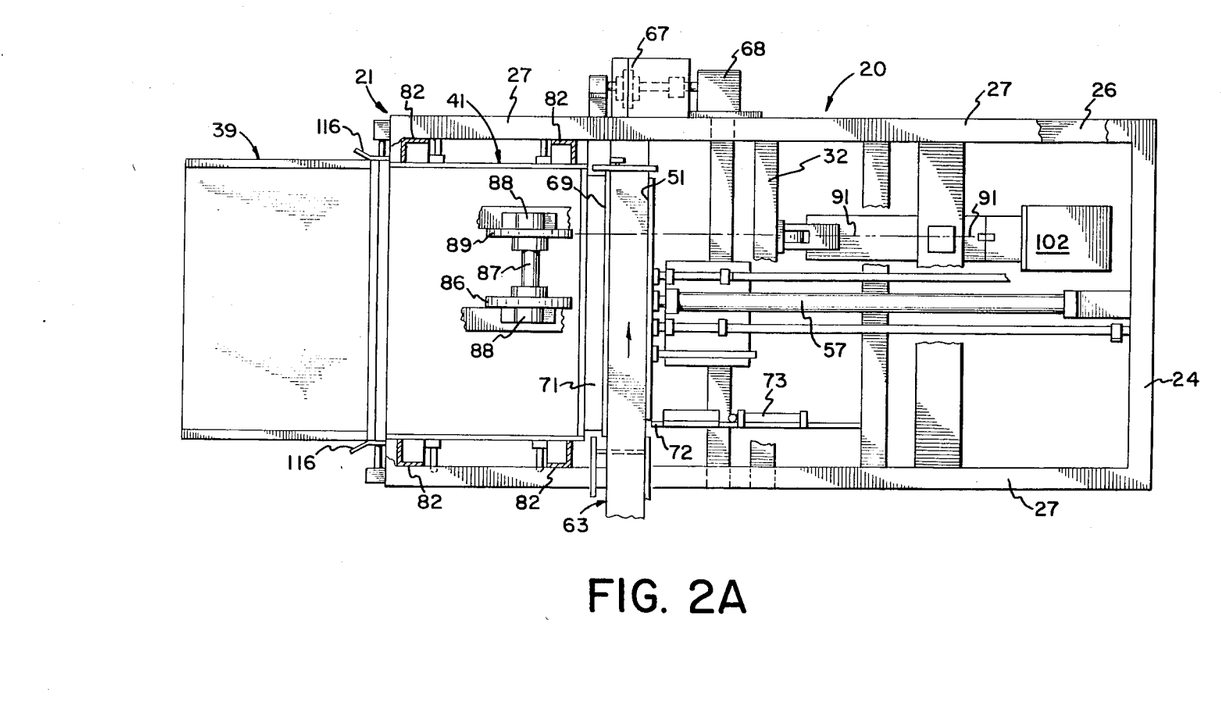
FIG. 2A is a top plan view of the cart loader of FIG. 2.

Staging zone 36 first receives the advancing containers delivered by the infeed conveyor line 63, best shown in FIG. 13. There container 64 is illustrated arriving on the conveyor 63, which is shown endwise in cross-section, delivering container 64 away from the viewer toward the cart loader 20. The return portion 66 of conveyor 63 is shown below container 64, thus forming an endless belt of conveyor segments driven, for example, by a conventional conveyor chain whose drive sprocket 67 is mounted on the drive shaft of an infeed conveyor motor 68 mounted on the left side of main frame 21, as best seen in FIG. 2A. The infeed conveyor 63 may receive containers delivered by an abutting conveyor line, or it may be elongated to extend across the plant to a previous packaging or labelling station, if desired.

Directly beside infeed conveyor 63 extending along the front edge thereof is a retractable guide curb 69, shown in FIG. 13. This is an elongated block actuated by a vertically positioned pneumatic cylinder with a short stroke connected to reciprocate the guide curb vertically between a lower retracted position, shown in solid lines in FIG. 13, to a deployed upper position shown in dash lines where it stands upward beside the lower edge of containers 64 as they advance along and feed conveyor 63. Drive curb 69 serves to retain containers 64 in substantial alignment as they progress across the infeed conveyor, assuring that containers 64 will not catch, snag, or twist during their lateral progress across frame 21.

Appropriate sensors indicate when a full column of containers 64 has advanced to fill infeed conveyor 63 across the entire width of frame 21. Central pusher 51 is then actuated to advance one container width, to deliver this column of containers 64 forward to the infeed staging platform 71 directly beside infeed conveyor 63.

During this delivery stroke the retractable guide curb 69 is automatically lowered by its pneumatic cylinder to permit the forward movement of the entire column of containers 64 onto the staging platform 71. At the same time, an infeed gate 72 with its own actuating cylinder 73 is deployed in a forward direction across the infeed conveyor 63 to block the advance of additional containers until this staging stroke has been completed.

Figure 14A:
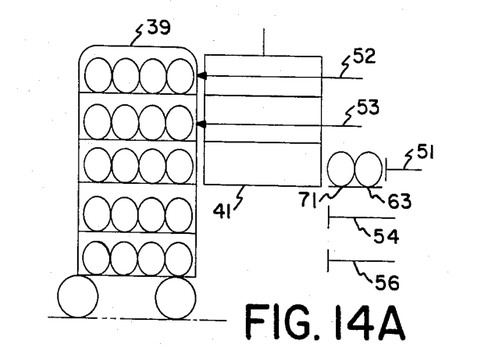
FIGS. 14A through 14H are schematic diagrams showing successive steps in an operating cycle.
Figure 14B:
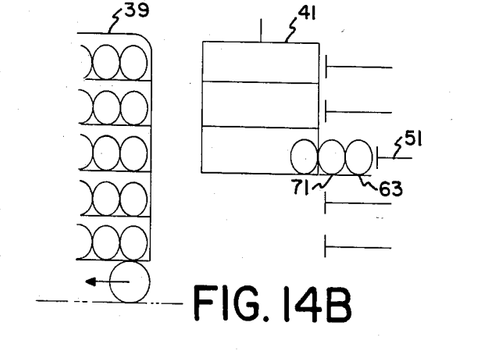

As the central pusher 51 retracts back across infeed conveyor 63, it engages and draws back infeed gate 72, releasing the next container to be delivered by infeed conveyor 63. Guide curb 69 is again deployed upward as well. When the second column of infeed containers has progressed across the width of infeed conveyor 63 to a position aligned with the containers standing on staging platform 71, guide curb 69 is retracted and pusher 51 is again actuated, if elevator 41 is in position. While guide curb 69 is retracted and infeed gate 72 is deployed, this stroke of pusher 51 delivers the front column of containers 64 sliding from staging platform 71 onto the adjacent deck of elevator 41, i.e., from the staging zone, as shown in FIG. 14A to the elevator zone as shown in FIG. 14B. In FIG. 13 this is the upper deck 44 of elevator 41. The center deck 43, and lower deck 46 are shown as fully loaded with four columns each of containers 64 in FIG. 13.

Elevator

Figure 14C:
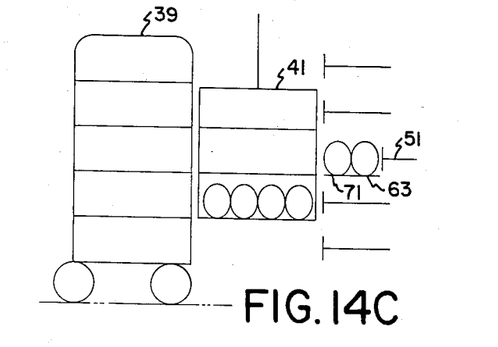

An elevator 41 having three decks 43, 44 and 46 is illustrated in FIG. 2, which shows elevator 41 in its topmost position with its lower deck 46 aligned with the infeed conveyor 63 and infeed staging platform 71. FIGS. 14C and 14G show the elevator 41 in its middle position with its middle deck 43 in position for loading. FIG. 13 shows elevator 41 in its lowermost position with its upper deck 44 aligned with infeed conveyor 63 and infeed staging platform 71 just prior to translation movement of pusher 51 to deliver columns of containers 64 onto upper deck 44 of elevator 41.

The vertical adjustment mounting of top deck 44 and bottom deck 46 is best seen in FIGS. 9 and 13. There, angle brackets 47 having a vertical slotted flange are shown bolted through vertical slots into corner posts 48 of elevator 41, supporting top deck 44, and bottom deck 46 is supported by similar angle brackets 47. A jack screw 49 mounted for vertical jacking movement relative to corner post 48 and bearing against each angle 47 allows the angles 47 to be raised or lowered as desired. These jack screws are also clearly shown in FIG. 13, and permit the vertical spacing between decks 43, 44 and 46 to be adjusted in order to match the vertical spacing between the shelves of the rolling cart 39, as indicated in FIG. 2.

Also shown in FIG. 13 are adjustable lower stops 78, comprising threaded bolts mounted for vertical adjustment in suitable threaded apertures in a stop bracket 79 extending laterally from the lower side bar 81, substantially in the middle of each lower side end of elevator 41, for engagement with the lower side rails 26, as elevator 41 reaches the lower end of its travel, as indicated in FIG. 13. Corner posts 48 of elevator 41 are embraced by angles 82 welded to the main frame members and defining the vertical elevator "shaft" within which elevator 41 reciprocates vertically.

Shown in FIGS. 2 and 13 is a bridge beam 83 overlying the upper end of the elevator 41 and extending from front to rear, connected at its center point by an hoisting chain 84 which extends upward from elevator 41 over a sprocket wheel 86 mounted to rotate in the central vertical plane of the frame 21. Sprocket wheel 86 is mounted for rotation on a horizontal transverse shaft 87 journalled in bearing blocks 88 mounted on short longitudinal frame members positioned above the uppermost plane of the frame 21 defined by upper side rails 27 and top rails 24.

Offset from the central vertical plane of frame 21 toward the left side of the frame is a second sprocket wheel 89 also keyed on shaft 87 and connected to a second counterweight chain 91 secured to the periphery of offset sprocket wheel 89. Chain 91 extends from the uppermost periphery of wheel 89 rearward toward a second smaller counterweight sprocket wheel 92 mounted on a rear shaft 93 which has its ends journalled in two end bearing blocks. These are a bearing block 94 (FIG. 3) bolted to the top side of the left upper side rail 27, and a cantilevered bearing block 96 (FIGS. 4 and 7) extending rearward above the transverse frame member 33. This is a sturdy beam illustrated as a double rectangular-section box beam 33 welded in position spanning the upper face of frame 21 between upper side rails 27 and between rearmost central side posts 31 and the rear corner posts 22.

The offset counterweight chain 91 extends rearward from the offset sprocket 89 over counterweight sprocket wheel 92 from which it descends to the counterweight supporting balance arm 97, as indicated in FIGS. 2, 3, and 5–7. Chain 91 has its forward end secured to the periphery of offset sprocket wheel 89 at a point which allows shaft 87 to rotate through the entire arc required to provide full angular reciprocation of balance arm 97 from its lowermost position 97A shown in FIG. 2, to its uppermost position 97B. The vertical center plane sprocket wheel 86 over which hoisting chain 84 is engaged has the free upper end of hoisting chain 84 secured to the periphery of wheel 86 at a point which allows the identical arc of rotation of shaft 87 to provide the lowering and raising of the length of hoisting chain 84 required to lower and raise elevator 41 between its top position shown in FIG. 2 and its bottom position shown in FIG. 13.

In the illustrated embodiment, this reciprocal stroke length of elevator 41 is typically 23 inches, the distance which amounts to double the distance between the container supporting surfaces of adjacent shelves on cart 39. Sprocket wheels 86 and 89, each being of one foot diameter, provide ample circumference to accommodate the length of hoisting chain 84 and counterweight chain 91 required for this purpose.

Chain 91 and its sprocket wheels are laterally offset to permit the angular reciprocation of counterweight balance arm 97 in the rear counterweight zone of frame 21 beside the elongated central pusher cylinder 57, which is preferably centered to minimize dynamic twisting or skewing which might be accentuated if its piston rod were anchored to the central pusher 51 at any point along its lateral dimension other than its central plane.

Clearly shown in FIGS. 1 and 13 are drawbridge or gangplank-style flip ramps 98, having their rearmost edges hinged to the protruding forward edges of each elevator deck 43, 44 and 46. These gangplank-style flip ramps 98 are each actuated by small, diagonally pivoted air cylinders 99 whose stationary ends are pivotally mounted on the elevator corner post above each elevator deck, and whose articulating piston ends are pivotally mounted midway along the side edges of flip ramps 98, as shown in the drawings. The extension of these piston rods lowers the flip ramps 98 to the cartloading position shown in FIG. 13, while retraction of the piston rods into cylinders 99 raises the flip ramps 98, assuring that containers loaded on elevator 41 will not be inadvertently dislodged during latching disengagement and removal of the filled cart 39, and the latching engagement of the next empty cart for the next cart-loading operation.

Counterweight Balance Arm

Figure 5:
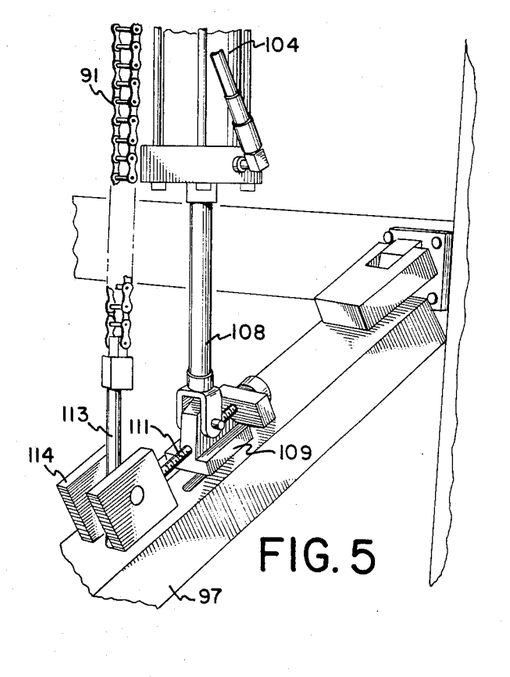
FIG. 5 is an enlarged fragmentary left rear corner perspective view showing the counterweight and the adjustable connections with its pneumatic cylinder and its elevator chain as well as its pivotal connection to the frame.
Figure 6:
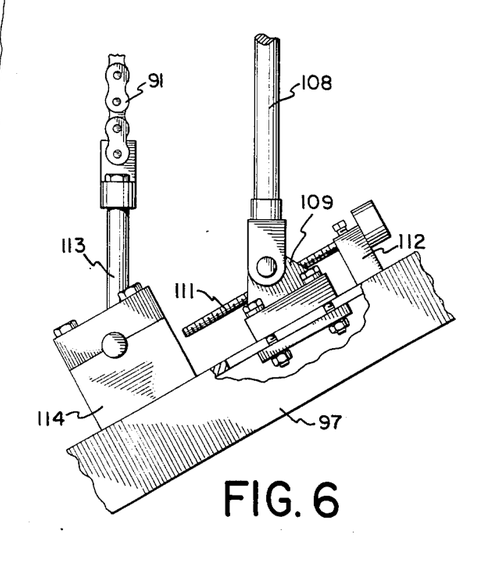
FIG. 6 is a fragmentary enlarged left side elevation view of the same counterweight and adjustable connections.

As clearly shown in FIGS. 5 and 7, the balance arm 97 has its forward end sturdily pivoted for reciprocating angular motion to a pivot-mounting block 101 which is securely anchored to the central transverse box beam 32, preferably formed as shown in FIG. 7 by a pair of square cross-section tubular box beams welded spanning the frame between lower portions of middle side posts 29.

Mounted at the rear end of balance arm 97 is a counterweight 102 whose weight is selected, when added to the weight of the associated components also supported by the counterweight chain 91, to approximate the weight of elevator 41 when it is half loaded with containers 64, thus significantly minimizing the force required to raise and lower elevator 41 between its limit positions.

Figure 4:
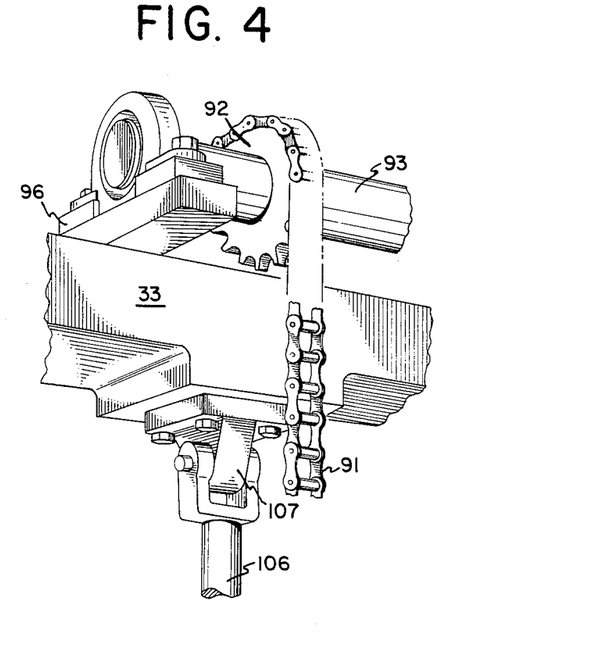
FIG. 4 is a fragmentary greatly enlarged right rear corner perspective view showing the elevator's counterweight chain and its rear sprocket.

A series arrayed pair of pneumatic cylinders 103 and 104 have their fixed ends anchored together, with their central axes co-axially aligned along a generally vertical axis extending from balance bar 97 to overlying transverse top box beam 33, to which piston rod 106 of the upper cylinder 103 is pivotally anchored by a sturdy pivot block 107, as shown in FIGS. 2 and 4.

To avoid twisting of pneumatic hoses powering the cylinders 103 and 104, an anti-twist guide rod 105 depending from upper piston rod 106 extends downward over the length of cylinder 103 and parallel thereto, as shown in FIG. 7. A follower block 105A bolted to the upper end of cylinder 103 is bored for telescoping sliding engagement with guide rod 105, resisting any tendency for connected cylinders 103–104 to rotate as they extend and retract.

Piston rod 108 of lower cylinder 104 has its downwardly extending free end pivotally mounted in a similar pivot block 109 and 107 slotted for sliding longitudinal movement along balance bar 97 to which the block 109 is bolted through longitudinal slots in its base. Block 109 is also provided with a longitudinal threaded aperture through which an adjustment lead screw 111 is threadedly engaged. Lead screw 111 is also threaded into a fixed block 112 bolted to balance arm 97, whereby rotational adjustment of lead screw 111 causing its longitudinal translation relative to block 112 and balance bar 97 causes pivot block 109 to move longitudinally along bar 97, after which its bolts may by tightened to secure block 109 in the desired adjusted position at a selected radius from the pivot pin joining bar 97 to block 101 on transverse beam 32.

This adjustment of lead screw 111 producing the desired fine adjustment in the reciprocating radius from pivot block 101 of the pivot pin joining piston rod 108 to balance arm 97 selects the balance arm stroke angle between positions 97A and 97B shown in FIG. 2, and correspondingly adjusts the total stroke length of elevator 41 to the desired dimension, which corresponds to twice the spacing between shelves of cart 39 in the illustrated embodiment.

Figure 3:
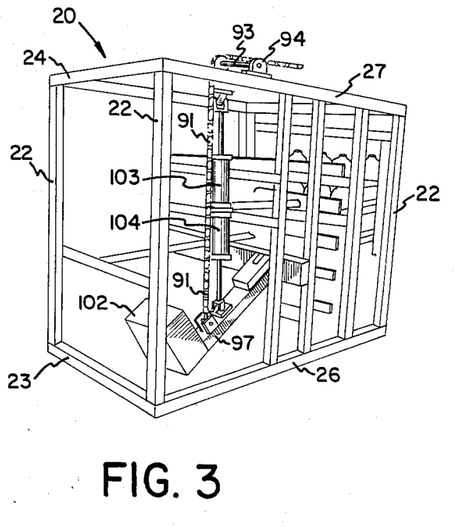
FIG. 3 is a left rear corner perspective view of the same cart loader showing the counterweight in its lowermost position corresponding to the uppermost position of the elevator.

The pivoted connection between the lower end of counterweight chain 91 and balance arm 97 is likewise adjustable through a turnbuckle connection 113 cooperating with a pivot block 114 secured to balance arm 97. Adjustment of turnbuckle 113 allows the angular adjustment of the sprocket wheel shaft 87 above elevator 41 to raise or lower the elevator to the precise limit positions desired, to match the height of shelves of cart 39 latched in the loading zone 38. As indicated in the drawings, the two pneumatic cylinders 103 and 104 connected in series automatically allow the elevator 41—balance arm 97 mechanism to attain its three predetermined positions in which the elevator decks are aligned with the shelves of cart 39, by dimensioning cylinders 103 and 104 to bring balance bar 97 to its upper position 97B when both pistons are retracted into both cylinders, lowering elevator 41 to its lowermost position; by extending one piston, such as the lower piston 108 from lower cylinder 104, to lower balance bar 97 to its central position shown in FIGS. 2 and 7 while maintaining the upper piston 106 retracted, elevator 41 is brought to its middle position as illustrated in FIGS. 1, 3 and 8; and by bringing balance bar 97 to its lower position 97A by extending both pistons 106 and 108, as shown in FIGS. 1, 3, 5, 6 and 13, elevator 41 is brought to its lowermost position.

Cart Loading Zone

In order to assure alignment of cart 39 with the decks of elevator 41 for loading of containers 64 from the elevator directly to the shelves of cart 39, the cart loaders of the present invention incorporate latching mechanisms for guiding and securing cart 39 in its loading position in cart loading zone 38.

Positioned in the lower front corner of each front corner post 22 is a converging guide flange 116, as shown in FIGS. 2A, 8, 11 and 12. As a fresh, unloaded cart 39 is maneuvered into position in front of the frame 21, its corners engage the guide flanges 116 and guide it into a position juxtaposed with the open front face of the elevator shaft portion of the cart loader 20.

Figures 10, 11:
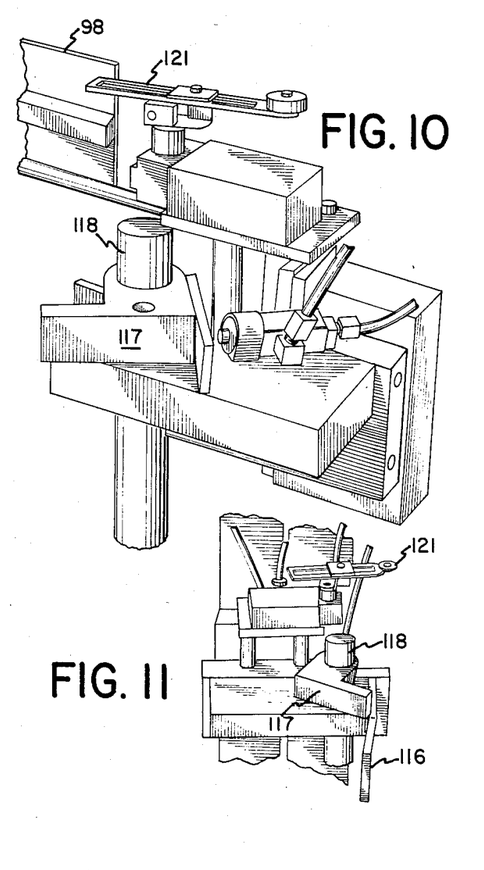
FIG. 10 is a greatly enlarged right front corner perspective view of the upper cart latch mounted on the corner post of the main frame.
FIG. 11 is a greatly enlarged left front corner perspective view of the lower left cart latch.
Figure 12:
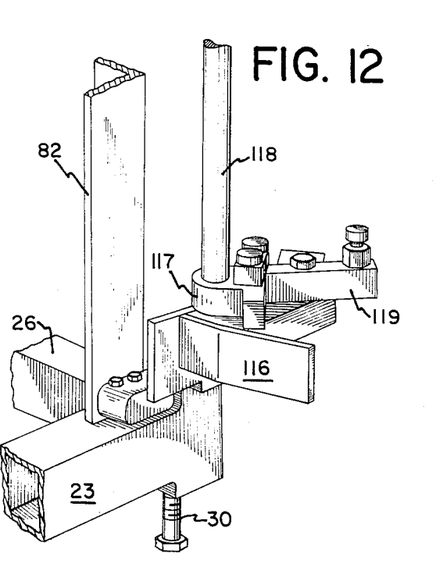
FIG. 12 is left front corner perspective view of the lower right front corner of the cart loader showing the lower right cart latch.

Pivoting upper and lower latch blocks 117 and 119, mounted on a pivot rod 118 having a vertical axis journalled close to each front corner post 22 for pivotal movement relative thereto, provide the latching engagement securing cart 39 in its loading position in the cart loading zone 38. The upper right cart latch 117 is shown in FIG. 10, and the upper left cart latch 117 is shown in FIG. 11. The lower right cart latch 119 at the lower end of pivot rod 118 is shown in FIG. 12.

A cart sensor 121 is mounted in the path of cart 39 to be pivoted rearwardly as the cart is maneuvered into position between guide flanges 116 and latched behind the cart latch blocks 117 and 119. Sensors 121 are best seen in FIGS. 10 and 11, and these sensors assure that loading of containers from elevator 41 to cart 39 will be delayed until cart 39 is latched in its loading position in the cart loading zone 38. Cart 39 is customarily provided with a vertically sliding gate 122, similar to the vertically sliding gates normally mounted on hospital beds to assure that patients will not roll out of the bed. Cart gate 122 is shown in FIG. 2, and in the latched position of cart 39 secured by latching blocks 117 and 119, the uppermost bar of gate 122 is positioned directly above a gate lift flange 45 of gate lift mechanism 42, shown in FIGS. 1 and 2. The gate lift mechanism 42 is mounted vertically on the upper front central portion of frame 21, and comprises a pneumatic cylinder whose piston rod extends downward to provide support for gate lift flange 45. When the piston is retracted into this pneumatic cylinder, gate lift flange 45 is drawn upward, raising the cart gate 122 to its loading position where its horizontal bars are aligned just below the cart shelves, providing lateral access for sliding delivery of containers 64 from the decks of elevator 41 down gangplank flip ramps 98 onto the shelves of cart 39.

It should be noted that pusher 51 with its extra long actuating cylinder 57 is provided with three delivery positions, best shown in FIG. 13: position 51A is the first of these pusher positions, in which containers 64 move from infeed conveyor 63 to infeed staging platform 71. The second position 51B, just beyond staging platform 71, is the position at which pusher 51 has delivered the last column of containers 64 onto the the deck of elevator 41 in FIG. 14F, thus providing four columns of containers 64 on the elevator deck corresponding to the four columns of containers illustrated on middle deck 43 and lower deck 46 in FIG. 13. The final position 51C of the pusher 51 is illustrated at the lefthand central portion of FIG. 13, corresponding to terminal positions 54C and 56C for the two lower pushers 54 and 56, and corresponding to the front edge of the middle and lower decks 43 and 46 of elevator 41. If flip ramps 98 remain between the righthand row of containers 64 and the shelf of cart 39 on which the containers have been delivered by these pushers in their positions 51C, 54C and 56C, lowering of the cart gate by extension of the cylinder actuating the gate lift flange 45 will assure that these containers remain on the cart shelves when the cart is unlatched and disengaged from the cart loader 20, and the flip ramps 98 will slide out from between the containers 64 and cart shelves as the cart is rolled away from the cart loader. Thereafter, flip ramps 98 can be hinged upwardly as their cylinders 99 are retracted in preparation for the next loading operation.

While four columns of one-gallon milk containers are here described as filling each elevator deck and each cart shelf, more columns of smaller containers or fewer columns of larger containers may also be used if desire.

Operating Cycle

The successive schematic diagrams of FIGS. 14A through 14H illustrate typical successive steps in the operating cycle of the cart loaders of the present invention. In the preferred embodiment adapted to load a five-tiered cart 39, illustrated in the figures, the fully loaded cart is shown in FIG. 14A, where its top two shelves have just been loaded by the advance of the upper pushers 52 and 53 urging the columns of containers arrayed on the two upper decks of elevator 41 onto the two upper cart shelves. At the same time, two new columns of containers are being assembled at the infeed conveyor and the infeed staging platform.

FIG. 14B shows the fully loaded cart 39 being withdrawn, and the first of the same two columns of containers has now been delivered to the near half of the elevator's lower deck while a third column of containers is advancing down the infeed conveyor.

In FIG. 14C a new empty cart 39 has been rolled into position and latched in place in front of the cart loader. The elevator 41 has now had its lower deck loaded with four columns of containers, and the elevator has been lowered one level to expose its middle deck for loading.

Figure 14D:
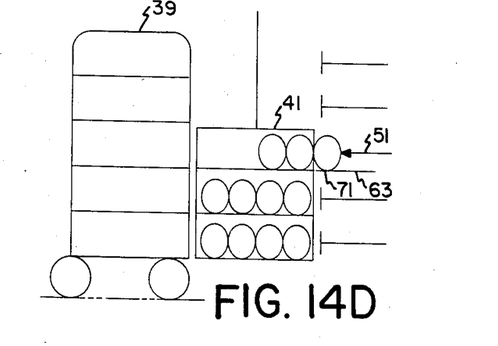

In FIG. 14D both lower decks of elevator 41 have been loaded and the elevator has been lowered to the bottom of its reciprocating stoke. The first two columns of containers have just been loaded on the near half of the elevator's upper deck by the central pusher 51.

Figure 14E:
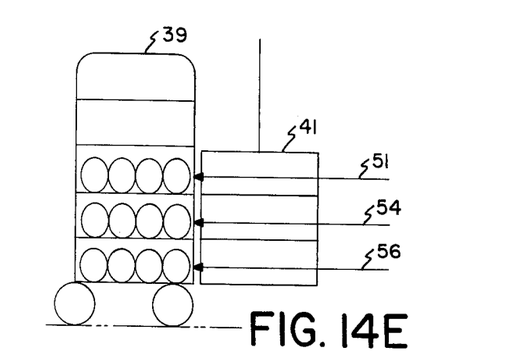

In FIG. 14E three full elevator decks loaded with arrayed columns of containers have just been swept from the elevator decks onto the latched cart, which now has its three lower shelves filled with containers and the central pusher 51 and the two lower pushers 54 and 56 are both shown at the completion of their advance stroke.

Figure 14F:
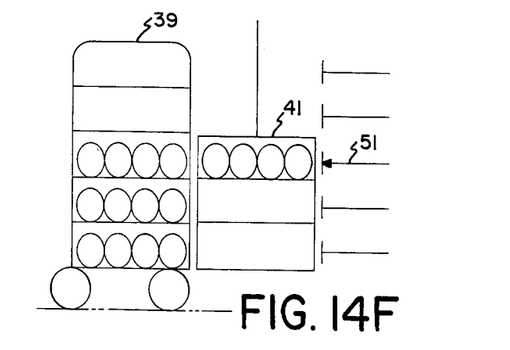
Figure 14G:
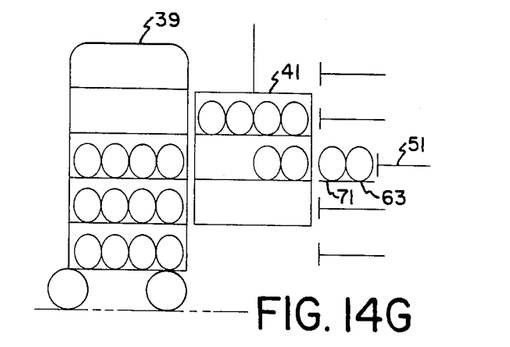

In FIG. 14F, while elevator 41 remains at the lower end of its reciprocating stroke, four new columns of containers have been loaded on the uppermost shelf of the elevator. In FIG. 14G, the elevator has been raised one level, and its middle deck is shown half loaded with the next two columns of containers ready for delivery to its middle deck from the infeed conveyor and the infeed staging platform.

Figure 14H:
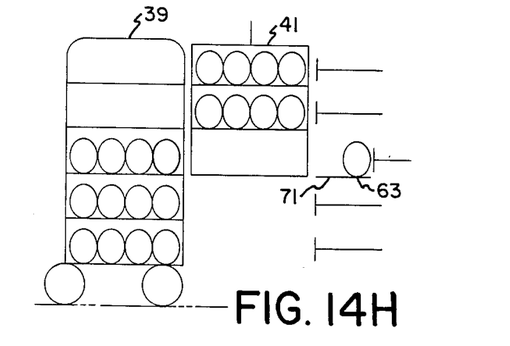

In FIG. 14H, the elevator with its middle and upper decks fully loaded has been raised to its upper position, with its empty lower deck aligned with the infeed conveyor. As the first row of containers advances down the infeed conveyor in front of central pusher 51, the two upper pushers 52 and 53 are both actuated to advance all containers from both upper decks of the elevator to the two top shelves of cart 39, producing the fully loaded cart shown in FIG. 14A, and the operating cycle is repeated.

Rolling carts with even numbers of two, four, or six shelves may be used if desired, but multi-tiered carts with odd numbers of shelves are believed to be more time-effective. When a cart with an odd number of three, five, seven, or nine shelves is employed, this number of shelves may be represented by the expression $2N+1$, and it is believed that an elevator with $N+1$ decks is most efficient in achieving minimum cycle time accompanied by maximum cart switching time for removal of the filled cart shown in FIG. 14A and FIG. 14B, and the maneuvering and latching of an empty cart into position ready for loading, shown in FIGS. 14C and 14D.

Thus a seven-shelf cart would employ a four-shelf elevator; the five-shelf cart, illustrated in the drawings, employs a three-shelf elevator; and a three-shelf cart would employ a two-shelf elevator. The size and weight of the objects being loaded from the infeed conveyor onto the multi-tiered cart will of course govern the convenient size and maneuverability of the loaded cart, dictating the number of shelves selected for maximum convenience of the users.

While the operating cycle has been illustrated with the lower three shelves of the five-tiered cart 39, being loaded first in FIG. 14E, and the top two shelves being loaded at the end of the operating cycle in FIGS. 14H and 14A, with the lower deck of the elevator being reloaded during cart switching and unlatching, as shown in FIG. 14B. However, either end of the elevator stroke may be employed for this purpose so long as the remaining elevator deck is aligned for reloading during the cart unlatching and switching steps. If all $N+1$ elevator decks are loaded simultaneously onto either the topmost or lowermost $N+1$ cart shelves, the remaining N cart shelves can be loaded simultaneously while the last elevator deck is being loaded. Thus the top three shelves of the five-tier cart may be loaded first, if desired, with the elevator then proceeding downward and being loaded successively until all of its lower two decks are fully loaded, after which those lower two decks may be transferred to the lower two shelves of the cart, while the upper deck of the elevator is being reloaded. The filled cart can be unlatched and removed as the elevator is being loaded and raised to successive levels, performing the reverse loading operation as compared to that illustrated in FIGS. 14A through 14H but achieving the same advantages and minimum cycle time.

When a cart 39 with an even number of 2N shelves is filled from an elevator 41, optimum use of elevator cargo space is believed to result when the elevator has ½ of 2N or N shelves, leaving a maximum of 50% of the operating cycle for changing carts before the elevator is fully loaded. When a cart 39 with an odd number of $2N+1$ a shelves is employed, the most efficient use of elevator cargo space is believed to be achieved by an elevator of $N+1$ shelves, leaving more than 50% of the operating cycle for changing carts: 4/7 or 57% when $N=3$, and 3/5 or 60% when $N=2$ as in the illustrated embodiment.

The electrical or pneumatic cycle control systems and the sensors, timers, counters and limit switches triggering each successive step in the operating cycle are believed to utilize well-known principles and systems, and therefore circuit diagrams and detailed control sequences have been omitted in order to emphasize the cooperating features and advantages of the present invention which are believed to be unique.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope on the invention which, as a matter of language, might be said to fall therebetween.

In the claims:

We claim:

1. A cart loader for assembling objects advancing along an infeed conveyor line into at least one column of objects, and transferring these objects to individual shelves of a multi-tiered rolling cart, comprising:
    A. a frame enclosing
        (1) a vertically elongated front elevator zone, and
        (2) a central staging zone rearwardly behind the elevator zone aligned to receive objects delivered by the infeed conveyor, as at least one lateral column across the staging zone,
    B. a multi-deck elevator movably mounted for reciprocating vertical movement within the elevator zone and having at least two decks spaced apart vertically by a distance corresponding to the vertical distance between shelves on the multi-tiered cart,
    C. cart latching means mounted on the front of the frame and defining the rear portion of a cart loading zone in which the multi-tiered cart is disengageably latched to the frame with its individual shelves presented to the elevator zone for loading,
    D. a plurality of horizontally forward deployable and rearward retractable pushers corresponding to the number of shelves of the multi-tiered cart, each pusher being aligned with one said shelf when the cart is latched to the frame, and positioned for delivery of objects from the elevator zone to the cart-loading zone, with one vertically central pusher being aligned with the infeed conveyor and having at least two forward stop positions, a proximal stop position in which objects propelled by the central pusher are delivered from the infeed conveyor to the aligned elevator deck and a remote stop position in which objects propelled by the central pusher have been swept from the elevator deck and delivered forward to the aligned cart shelf, E. elevator hoisting-lowering means connected to move the elevator between a top position with its uppermost deck substantially aligned with the top shelf of the cart, and a bottom position with its lowermost deck substantially aligned with the bottom shelf of the cart, F. and elevator stop means connected to stop the elevator at successive levels with each of its decks in turn aligned with the infeed conveyor and with one of said pushers.

2. The cart loader defined in claim 1 wherein the elevator is provided with at least half as many decks as the number of shelves in the multi-tiered cart.

3. The cart loader defined in claim 1 wherein the elevator is provided with N+1 decks and the multi-tiered cart is provided with 2N+1 shelves, where N is an integer greater than zero.

4. The cart loader defined in claim 1 wherein each non-central pusher above and each non-central pusher below said central pusher has a retracted rear position clear of the elevator zone, and an extended remote forward stop position in which an object propelled by said non-central pusher has been swept forward from an aligned elevator deck and delivered to the aligned cart shelf.

5. The cart loader apparatus defined by claim 4, wherein all pushers above the central pusher are actuated simultaneously, and all pushers below the central pusher are actuated simultaneously.

6. The cart loader apparatus defined in claim 3 wherein N=2.

7. The cart loader defined in claim 1 including a counterweight mounted at one end of a balance bar whose other end is pivotally connected to said frame, and wherein said hoisting-lowering means and said elevator stop means include a sprocket wheel chain assembly connecting the elevator to the balance beam, and an extensible and retractable pneumatic piston-cylinder assembly suspending the balance bar from the frame in a rear counterweight zone and having a plurality of stop positions corresponding to the number of said elevator decks.

8. The cart loader defined in claim 7, further including an adjustable turnbuckle interposed in the sprocket wheel chain assembly, whereby fine adjustment of the successive elevator levels is achieved.

9. The cart loader defined in claim 7, further including a movable connector joining the piston-cylinder assembly to the balance bar whereby the distance between said elevator levels is adjusted.

10. The cart loader defined in claim 7, wherein the counterweight and balance bar are selected to substantially match the weight of the elevator in its half-loaded condition.

11. The cart loader defined in claim 7, wherein the piston-cylinder assembly is a substantially vertically and co-axially aligned pair of pneumatic cylinders having their blind ends anchored together, with their respective pistons oppositely extending for respective pivoting connections with said frame and said balance bar.

12. The cart loader defined in claim 1 wherein the infeed conveyor extends laterally across the width of the frame directly behind the staging zone, further including an upwardly extendible guide bar positioned beside the forward edge of the infeed conveyor to align objects traveling thereon, which is downwardly retractable during actuation of the central pusher associated with the infeed conveyor.

13. The cart loader defined in claim 1, further including a staging platform positioned beside the infeed conveyor to receive a column of objects delivered one object's width by actuation of the pusher associated with the infeed conveyor.

14. The cart loader defined in claim 1 wherein the elevator is provided with a gangplank-style flip ramp hinged to the front edge of each elevator deck, retracted upward to retain objects on the elevator deck and deployed forward to release objects for loading from the elevator deck to the aligned cart shelf.

15. The cart loader defined in claim 1 wherein the cart latching means comprise latch blocks pivotable into latching engagement with the cart.

16. The cart loader defined in claim 15, further including converging guide flanges mounted on the frame and positioned to direct each arriving cart into seated engagement, anchored by the latch blocks.

17. A method for loading at a loading station a multi-tiered cart having 2N+1 shelves with objects delivered on an infeed conveyor positioned at the level of the middle cart tier, utilizing an elevator positioned between the infeed conveyor and the cart and having N+1 decks, wherein N is an integer greater than zero, comprising the steps of A. moving the elevator to a first end of its stroke, with a proximal elevator deck aligned with the infeed conveyor and the level of the middle cart tier, and a distal elevator deck aligned with a last cart tier, B. pushing objects from the infeed conveyor to the proximal elevator deck until said deck is filled, C. moving the elevator toward the opposite end of its stroke to align its next deck with the infeed conveyor, D. pushing objects from the infeed conveyor to said next elevator deck until said next deck is filled, E. repeating steps C and D until the elevator has reached said opposite end of its stroke and all elevator decks are filled, F. simultaneously pushing all objects loaded on all elevator decks onto aligned cart tiers, G. pushing objects from the infeed conveyor to load the distal elevator deck, H. moving the elevator toward said first end of its stroke until the next elevator deck is aligned with the infeed conveyor, I. pushing objects from the infeed conveyor to said next elevator deck until said next deck is filled, J. repeating steps H and I until said elevator is at said first end of its stroke and all elevator decks except said proximal deck are filled, K. simultaneously pushing all objects from all said elevator decks except said proximal deck onto aligned cart tiers, thereby completing the loading of all tiers of said cart, L. repeating steps B, C and D while removing the loaded cart and substituting an empty cart into loading position at the loading station, M. repeating steps E, F, G, H, I, J and K, whereby a continuous series of empty carts are loaded in turn.

* * * * *